United States Patent [19]

Montgomery

[11] 4,408,455

[45] Oct. 11, 1983

[54] WAVE ACTION ENERGY GENERATING SYSTEM

[76] Inventor: Melville G. Montgomery, 2 Evergreen Rd., Severna Park, Md. 21146

[21] Appl. No.: 264,682

[22] Filed: May 18, 1981

[51] Int. Cl.³ .............................................. F03B 13/12
[52] U.S. Cl. ...................................... 60/505; 60/497; 60/506; 60/507
[58] Field of Search ................. 60/497, 505, 506, 507; 74/578

[56] References Cited

U.S. PATENT DOCUMENTS

| | | | |
|---|---|---|---|
| 559,107 | 4/1896 | Rose | 60/505 |
| 1,385,083 | 7/1921 | McCulley | 60/505 |
| 4,319,454 | 3/1982 | Lucia | 60/505 |

FOREIGN PATENT DOCUMENTS 502426 7/1919 France .................................. 74/578

Primary Examiner—William R. Cline
Assistant Examiner—S. Gayle Dotson
Attorney, Agent, or Firm—Walter G. Finch

[57] ABSTRACT

The invention is an improvement in the economical generation of energy by providing a system for utilizing the wave action of bodies of water, such as ocean waves. The system consists of a pair of floating units, each separately connected to a shaft member by a connecting arm, a ratchet-like gear affixed to the shaft member is indexed forward alternately or concurrently by spring loaded pawls affixed to each of the connecting arms from the floating units to the shaft members. The wave action alternately raising and lowering the floating units concurrently turns the ratchet-like gear through the action of the pawls. Thus, the turning shaft, properly geared can turn an electric generator, air compressor, or other device of generating another form of energy which can be used or stored for future use.

8 Claims, 4 Drawing Figures

WAVE ACTION ENERGY GENERATING SYSTEM

BACKGROUND AND SUMMARY OF THE INVENTION

The invention relates to energy generating systems and in particular to systems operated by nature's forces. Specifically, the invention relates to energy generating systems utilizing the forces of bodies of water, such as the waves of an ocean.

With the increasing national needs for energy and the shrinking of domestic supplies of such forms as oil, gas, and coal, and the constant threat of the denial of sufficient supplies of some forms of energy, such as oil, from outside the domestic area, the need for other means to generate energy has increased. The present invention fills a portion of that need.

It is also to be noted that the operation of this energy generating system is pollution free, which is of particular importance in helping to improve the environment.

Attempts have been made in the prior art to harness the energy of bodies of water, such as by the movement of water from a higher elevation to a lower elevation, by the rise and fall of the tides, and other types of prior art uses of water. None of the prior art attempts have harnessed the wave action of the bodies of water as is provided in the present invention.

The present invention mounts an energy generating means, such as an electrical generator, air compressor, or similar device on a stationary or floating platform and then provides a means for operating that energy generating means utilizing the wave action of a body of water.

The present invention can also be the means of direct connection to an operating device, such as a pump, instead of first generating a form of energy to operate the device.

Essentially the wave action energy generating system consists of a pair of floating units that move more or less vertically in an upward and downward direction. It is to be understood that the system can consist of a plurality of these pairs of floating units operating concurrently to operate one or more energy generating devices, and such plurality of the pairs of floating units is within the scope and intent of this invention.

The pair of floating units are each separately connected to a shaft means by a connecting means. The pair of floating units and the connecting means are assembled opposite each other on either side of the shaft means.

Mounted on the shaft and in line with the connecting means is a gear-like wheel with ratchet-like teeth. A spring-loaded pawl affixed to each of the connecting means, where the connecting means approaches the periphery of the gear-like wheel, is so arranged so that the pawls intermesh with the ratchet-like teeth.

The pawls are pointed in opposite directions so that they both mesh with the ratchet-like teeth on opposite sides of the gear-like wheel.

As the floating units rise and fall with the wave action of the water the movement pushes each of the pawls in a direction that turns the gear-like wheel and which, in turn, revolves the shaft means.

The shaft means is suitably connected by a train of gears to provide motion to whatever generating means or operating device is to receive the energy generated by the wave action.

The mechanical take-off from the shaft means can be utilized for numerous purposes, such as turning a generator to generate electricity, operating an air compressor, turn the propeller on a self-propelled barge, boat, or ship, operate a pump, and other similar purposes. The electricity or compressed air generated can be used directly or stored for future use, such as for small tools and spray guns, power for buoys and navigational lights, drilling (such as off-shore) and other general lighting or power uses.

As noted hereinbefore, a plurality of the wave action systems can be connected to a common shaft or to a series of shafts and the energy means generated pooled.

It is, therefore, an object of the invention to provide a wave action energy generating system to generate power from the wave action of a body of water.

It is another object of the invention to provide a wave action energy generating system which can be operated as a plurality of individual units operating individually or in a common effort.

It is also an object of the invention to provide a wave action energy generating system which can be installed on a stationary platform.

It is still another object of the invention to provide a wave action energy generating system which can be installed on a floating platform.

It is yet another object of the invention to provide a wave action energy generating system which can transmit the energy through suitable means to power other energy generating means or power other mechanical means directly.

Further objects and advantages of the invention will become more apparent in the light of the following description of the preferred embodiment.

BRIEF DESCRIPTION OF THE DRAWINGS

FIG. 4 is an enlarged partial sectional view of the power transmission means of a wave action energy generating system on line 4—4 of FIG. 2.

DESCRIPTION OF THE PREFERRED EMBODIMENTS

Figure 1:
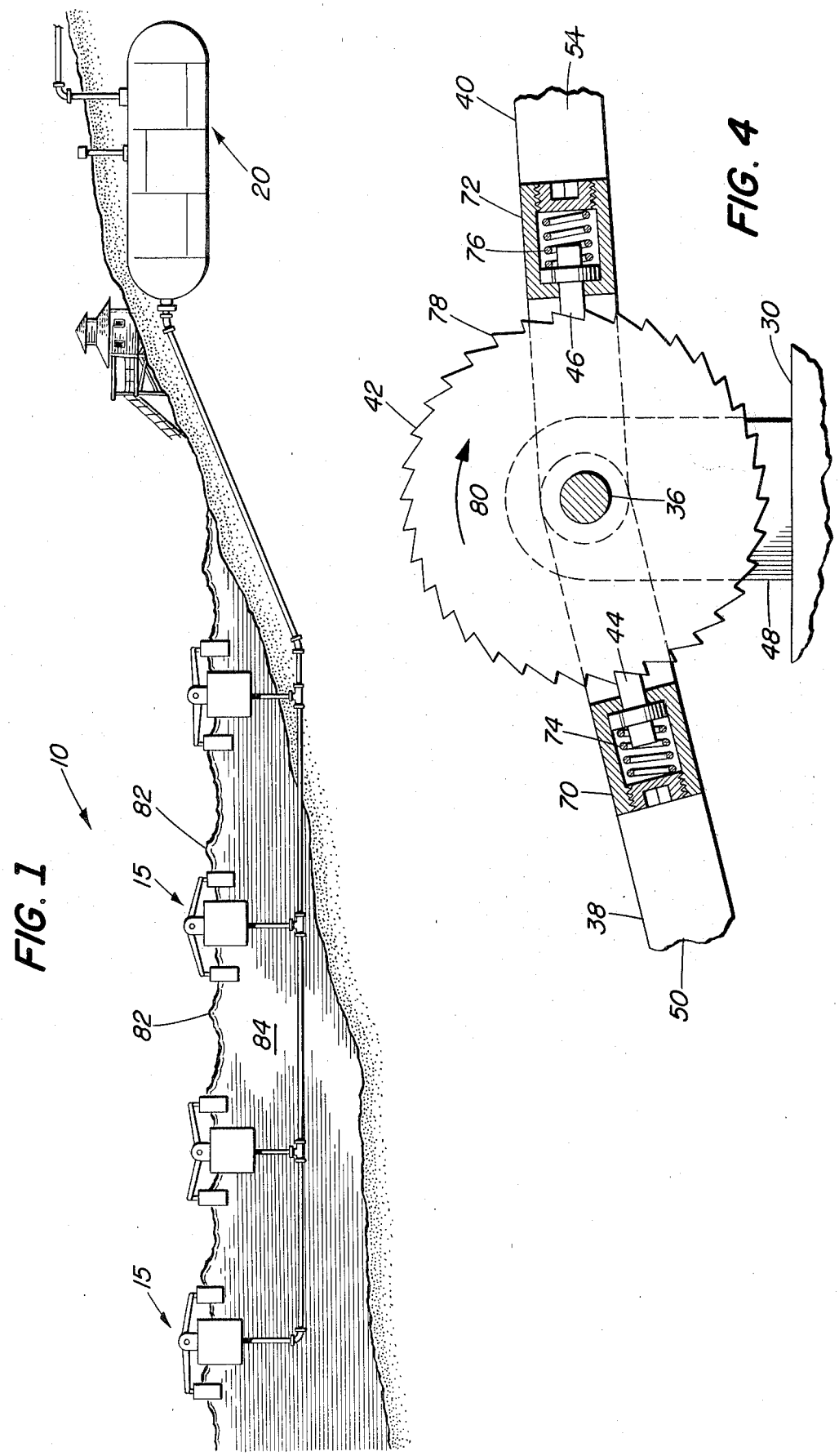
FIG. 1 is a schematic pictorial view of a plurality of wave action energy generating units of a wave action generating system.

Referring to the drawings and particularly to FIG. 1, a wave action energy generating system is shown at 10. The wave action energy generating system 10 is composed of one or more wave action energy generating units 15 and an energy storage or use means 20.

Figure 2:
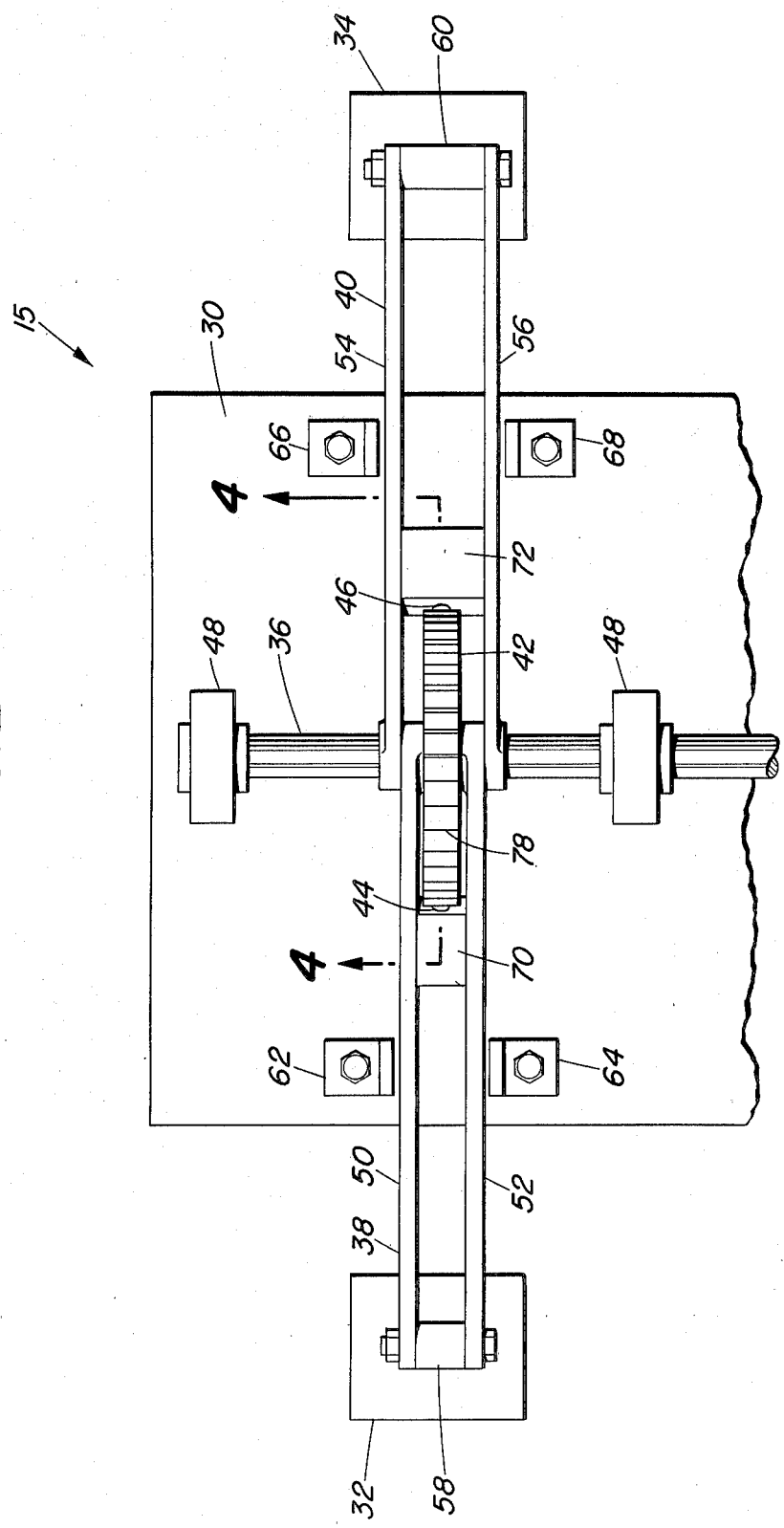
FIG. 2 is a top view of a wave action energy generating unit of a wave action energy generating system.
Figure 3:
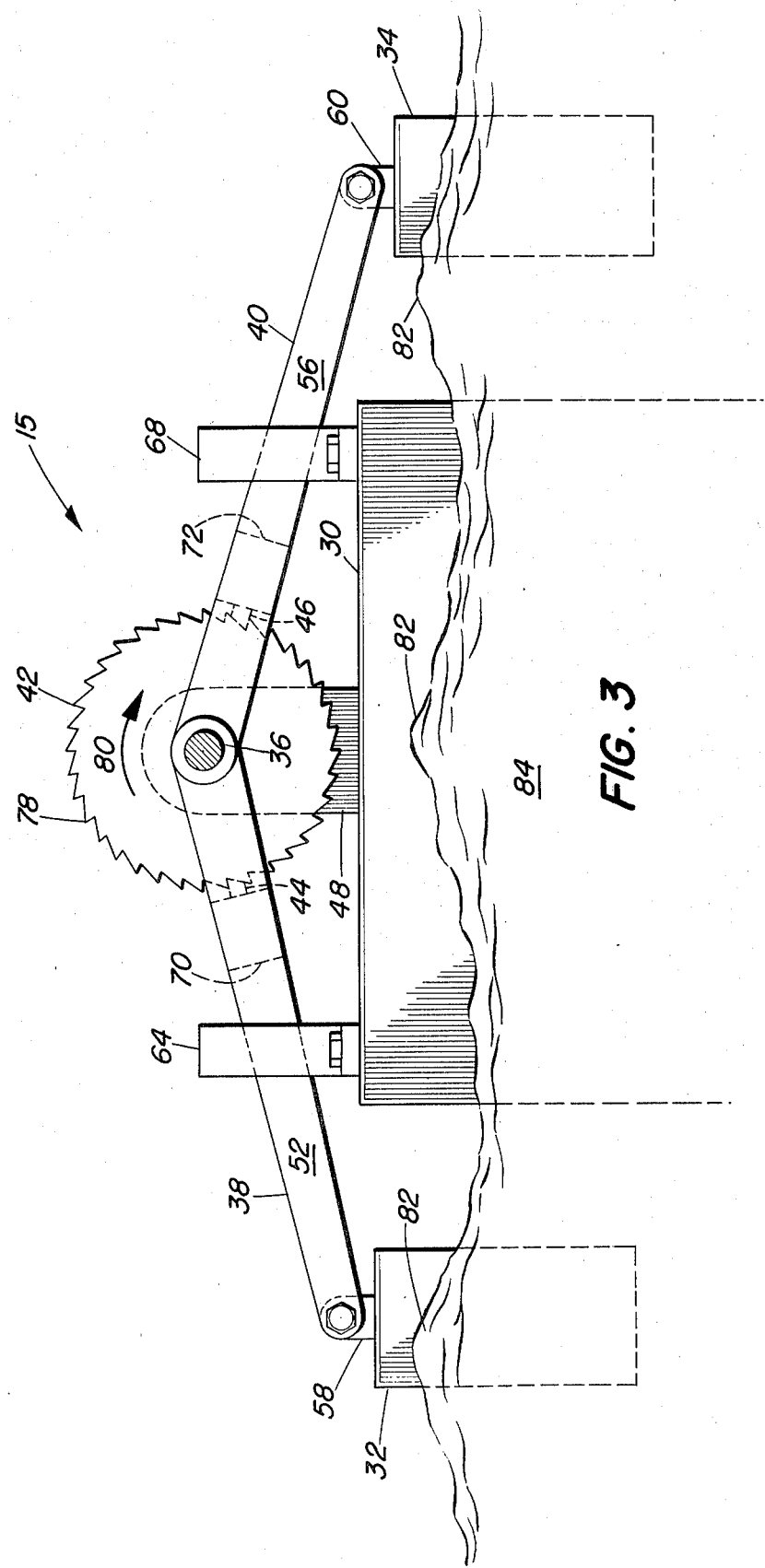
FIG. 3 is a side view of FIG. 2.

Turning now to FIGS. 2 and 3, a wave action energy generating unit is shown at 15. The wave action energy generating unit 15 is primarily composed of a base or platform means 30, a pair of floating wave action transmission means 32 and 34, a shaft means 36, a first connecting means 38 connecting the first floating wave action transmission means 32 to the shaft means 36, a second connecting means 40 connecting the second floating wave action transmission means 34 to the shaft means 36, a power transmission ratchet-like gear means 42, a first ratchet pawl 44, and a second ratchet pawl 46. Other elements that facilitate the cooperation of the aforementioned components of the wave action energy generating unit 15 are described hereinafter as the cooperation of components is explained.

The power transmission ratchet-like gear means 42 is affixed to shaft means 36 by means known in the art. Shaft means 36 is supported on and from the base or platform means 30 by suitable bearings on mounting structures 48. The bearing and mounting structures 48 are located on each side of the power transmission ratchet-like gear means 42 clear of the connecting means 38 and 40. In FIG. 3 the near side bearing and mounting structure 48 is not shown and has been omitted for purposes of clarity in showing the other detail of the mechanism. Both bearing and mounting structures 48 are shown in FIG. 2.

The first and second connecting means 38 and 40, respectively, each consist of a pair of spaced apart members. The first connecting means 38 consists of spaced apart members 50 and 52 and the second connecting means 40 consists of spaced apart members 54 and 56.

The members 54 and 56 are connected to the shaft means 36 in positions outside of the location of the members 50 and 52 on the shaft means 36. The members 50 and 52 are positioned on each side of the power transmission ratchet-like gear means 42. In other words, the members 50 and 52 of the first connecting means 38 straddle the power transmission ratchet-like gear means 42 and the members 54 and 56 of the second connecting means 40 straddle the members 50 and 52. Suitable space means separate the elements and components on the shaft means 36 to provide the necessary clearance for smooth operation.

At the distal ends of the connecting means 38 and 40 the spaced apart members 50 and 52 of connecting means 38 and the spaced apart members 54 and 56 of connecting means 40 straddle and connect to lug means on the first and second floating wave action transmission means 32 and 34 respectively. Spaced apart members 50 and 52 straddle and connect to lug means 58 on the first floating wave action transmission means 32, and spaced apart members 54 and 56 straddle and connect to lug means 60 on the second floating wave action transmission means 34. The lug means 58 and 60 are suitably affixed to the floating wave action transmission means 32 and 34 respectively.

Suitable spacer means are provided at the connection of the members 50 and 52 to lug means 58 and at the connection of members 54 and 56 to lug means 60. The connection of the members 50 and 52 to lug means 58 and the members 54 and 56 to lug means 60 may be by pin, bolt and nut, or other suitable means as long as there is sufficient clearance around the pin, bolt, or other means to permit free movement as the floating first and second wave action transmission means 32 and 34 rise and fall with the wave action.

The floating wave action transmission means 32 and 34 may be hollow or solid or some combination thereof as long as they are capable of floating and rising and falling with wave action to transmit that wave action to movement of the first and second connecting means 38 and 40 respectively. In that regard the ends of the first and second connecting means 38 and 40 are movably connected to the shaft means 36 so that the shaft means 36 may turn easily within the movable connection.

In order to keep the first and second connecting means 38 and 40 aligned between the first and second floating wave action transmission means 32 and 34, respectively, and the power transmission ratchet-like gear means 42, guide means are provided. Guide means 62 and 64 are located on each side of the first connecting means 38, with suitable and sufficient clearance, and suitably affixed to the base or platform 30. In a like manner guide means 66 and 68 are located on each side of the second connecting means 40. It is to be noted that the base or platform 30 may be a floating base or platform 30 or a fixed base or platform 30.

Between the members 50 and 52 of connecting means 38, at a suitable location close to the power transmission ratchet-like gear means 42, is a first pawl mounting or holding means 70. First ratchet pawl 44 is located within the first pawl mounting means 70 and is spring loaded by spring 74 in the mounting means 70.

The mounting means 70 is located between the members 50 and 52 and affixed to them in a position so that the tapered engaging end of the ratchet pawl 44 properly engages the ratchet teeth 78 on the power transmission ratchet-like gear 42. Also, the position of the mounting means 70 is such that when the spring 74 is compressed the ratchet pawl 44 will clear the ratchet teeth on power transmission ratchet-like gear 42 and permit the ratchet-like gear 42 to turn.

In a like manner, a second pawl mounting or holding means 72 is located between members 54 and 56 of connecting means 40. The mounting means 72 is located, positioned, and affixed to members 54 and 56 in a manner similar to the locating, positioning and affixing of mounting means 70. The second ratchet pawl 46 is likewise located within the second mounting means 72 and is spring loaded by spring 76 in the mounting means 72.

Note that the tapered engaging end of the ratchet pawl 46 also engages the ratchet teeth 78 on the power transmission ratchet-like gear 42. Also note that when spring 76 is compressed the ratchet pawl 46 will also clear the ratchet teeth 78 on power transmission ratchet-like gear 42 and permit the ratchet-like gear 42 to turn.

It is to be noted that the ratchet teeth 78 on power transmission ratchet-like gear 42 all slope or point in the same direction around the periphery of the power transmission ratchet-like gear 42.

It is further to be noted that the direction of the tapered engaging ends of the first and second ratchet pawls 44 and 46 are reversed when inserted in their respective pawl mounting means 70 and 72. This reversal of the direction of the tapered engaging ends of the racket pawls 44 and 46 is necessary so that the ratchet pawls 44 and 46 will properly slide over the back surface of the ratchet teeth and properly seat in the ratchet teeth gap to perform the ratchet action that gives turning motion to the power transmission ratchet-like gear means 42. The action will be described hereinafter.

As waves 82 of the body of water 84 move across the path of the floating first and second wave action transmission means 32 and 34, the wave action transmission means 32 and 34 rise and fall with the wave action. Depending on the direction, spacing, and other similar characteristics of the waves 82, the two floating wave action transmission means 32 and 34 may rise and/or fall separately or in unison, or some undulating sequence or cadence. Also, the height of the rise or fall of the two floating wave action transmission means 32 and 34 is dependent upon the wave heights.

As the floating wave action transmission 32 rises on a wave the wave action is transmitted through the rising connecting means 38 in an arcuate manner around a portion of the shaft 36. As the connecting means 38 moves in the arcuate direction around the shaft 36, the ratchet pawl 44, engaged in the ratchet teeth 78 of the power transmission ratchet-like gear means 42, transmits the arcuate motion to the power transmission ratchet-like gear means 42.

As the arcuate motion of the power transmission ratchet-like gear means 42 takes place, it concurrently turns shaft means 36 to which it is affixed. The turning or revolving shaft means 36, in turn, transmits the motion to whatever unit it is connected (a generator, compressor, or other such device). Suitable gear train arrangement between the revolving shaft and the driven unit can provide a mechanical advantage of increasing speed.

As the floating wave action transmission means 32 falls as the crest of the wave wanes or recedes, the ratchet pawl 44 slides or indexes backward over the curved or sloped ratchet teeth 78 compressing the spring 74 as necessary. At the bottom or lowest part of the fall by the floating wave action transmission means 32 the ratchet pawl 44, under action by the spring 74, seats itself in the nearest gap between ratchet teeth 78 and the assembly is ready for the next wave 82 action to again raise the wave action transmission means 32.

In a corresponding action, wave action transmission means 34 rises and falls with wave 82 action. In a like manner the wave action is transmitted through connecting means 40 and the arcuate movements are similar to those hereinbefore described. There is one difference, as the ratchet teeth 78 reach this side they are essentially pointing upwardly instead of downwardly, this was the reason for reversing the ratchet pawl 46 so that it will mate and fit into the reversed gap between the ratchet teeth 78.

As the wave action transmission means 34 rises the action at the ratchet pawl 46 is the reverse of that described for ratchet pawl 44. The rising connecting means 40 slides or indexes the reversed ratchet pawl 46 over the curved or sloped ratchet teeth 78, compressing the spring 76 as necessary. At the peak or top part of the rise by the floating wave action transmission means 34 the ratchet pawl 46, under action by the spring 76, seats itself in the nearest gap between ratchet teeth 78 and the assembly is now ready to transmit the energy to the shaft 36.

As the floating wave action transmission means 34 falls as the crest of the wave wanes or recedes, the ratchet pawl 46 pushes into the ratchet teeth 78 gap and turns the power transmission ratchet-like gear means 42 and with it revolves the shaft 36 to which it is affixed. This action is comparable to the aforementioned action for the assembly on the opposite side.

Thus, the continuous rise and fall caused by the wave 82 action is transmitted to the shaft 36 as a revolving motion and from the shaft the energy is transmitted as described hereinbefore to other uses.

It is to be noted that the system described herein can also be operated with the mechanism described for one side only of the structure.

Additional efficiency can be accomplished by including a flywheel affixed to the shaft means 36.

One form of use is to mount a generator, compressor, or other device directly below or in association with the shaft 36 and connect the drive shaft 36 to the device, in a mechanical advantage arrangement, by belts or gears.

Another form of use is to provide a plurality of wave action energy generating units 15 along an extended shaft means 36, each such unit imparting a transmitting energy to continue and maintain the revolving action of the shaft means 36.

An alternative is to provide a plurality of wave action energy generating units 15 installed on separate bases or platforms 30 and transmit the energy form generated (such as electrical energy, or compressed air) to a central accumulator means, such as illustrated in FIG. 1 for a wave action energy generating system 10. It is to be understood that the compressed air system illustrated in FIG. 1 is for illustration purposes and that the intent and scope of the invention includes other means of energy accumulation and storage.

As can be readily understood from the foregoing description of the invention, the present structure can be configured in different modes to provide the ability to transmit energy from wave action of a body of water.

Accordingly, modifications and variations to which the invention is susceptible may be practiced without departing from the scope and intent of the appended claims.

What is claimed is:

1. An energy generating system using the forces of wave action of a body of water to generate energy, comprising:

a base means, said base means having a first side, a second side, and a top side, said base means being located at a body of water, said body of water being subject to wave action;

a first float means, said first float means being located in said body of water on said first side of said base means, said first float means being subject to said wave action of said body of water, said first float means being in close vicinity of said base means;

a shaft means;

a gear means, said gear means having a plurality of ratchet-like teeth thereon around the periphery of said gear means, said gear means being suitably affixed to said shaft means;

a first connecting means, said first connecting means consisting of a first member and a second member, said first and second members of said first connecting means being spaced apart, said first connecting means having a first end and a second end, said first end of said first connecting means being pivotably connected to said first float means, said second end of said connecting means being pivotably connected to said shaft means;

a first housing means, said first housing means being hollow, said first housing means having an aperture in one end thereof said first housing means being located between and affixed to said spaced apart first and second members of said first connecting means;

a first spring means, said first spring means being a compression-type spring, said first spring means located and confined within said hollow housing means;

a first pawl means, said first pawl means having a first end and a second end, said first pawl means being located within said hollow housing means, said first end of said first pawl means protruding through and from said aperture in said hollow housing means, said second end of said first pawl means being in contact with said first spring means, said first pawl means thereby being spring loaded within said first hollow housing means, said fist hollow housing means being suitably located and affixed to said first connecting means so as to orient and position said first end of said pawl means protruding from said aperture in said holding means for proper meshing and operation with said ratchet-like teeth; and a support means, said support means being located upon said top side of and affixed to said base means, said support means supporting said shaft means.

2. An energy generating system as recited in claim 1 and additionally, a second float means, a second connecting means, a second housing means, a second spring means, and a second pawl means, said second float means, said second connecting means, said second housing means, said second spring means, and said second pawl means being located on said second side of said base means, each of said additional second components being assembled into a structure similar to said first float means, said first connecting means, said first housing means, said first spring means, and said first pawl means.

3. An energy generating system as recited in claim 2, wherein said base means is fixed in position.

4. An energy generating system as recited in claim 2, wherein said base means is a floating base means.

5. An energy generating system as recited in claim 2 and additionally, a first and a second guide means, said first and second guide means each consisting of a first and second member, said first and second guide means being located upon and affixed to said top side of said base means at said first and second connecting means, respectively, said first and second members of each said first and second guide means straddling said first and second connecting means, respectively, said first and second guide means maintaining the position and alignment of both said first and second connecting means, respectively, between said first and second float means, respectively, and said shaft means.

6. An energy generating system as recited in claim 2, wherein each of said first and second connecting means consists of a first member and a second member, said first and second members of said first connecting means straddling said gear means at said pivotable connecting of said first connection means to said shaft means, said first and second members of said second connecting means straddling said first and second members of said first connecting means at said pivotable connection of said second connection means to said shaft means.

7. An energy generating system as recited in claim 6 and additionally, a first and second lug means, said first and second lug means being located upon and suitably affixed to said first and second float means, respectively, said first and second lug means being the respective means by which said first and second connecting means are each pivotably affixed to said first and second float means, respectively.

8. An energy generating system as recited in claim 2 and additionally, an energy use means, said energy use means being suitably located and mechanically connected to said shaft means, said energy use means utilizing energy produced by said energy generating system and made available at said shaft means.

* * * * *